Patented Dec. 20, 1949

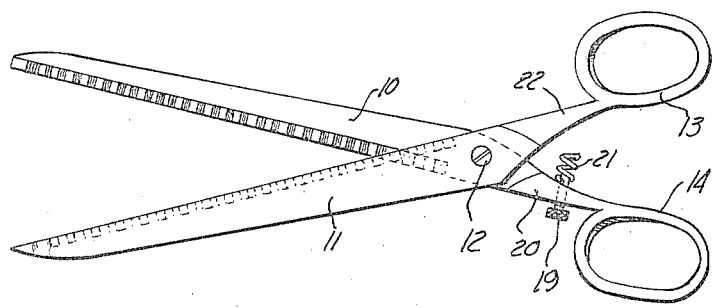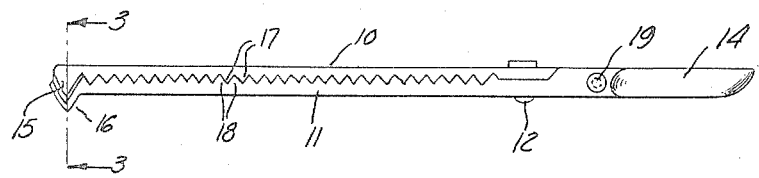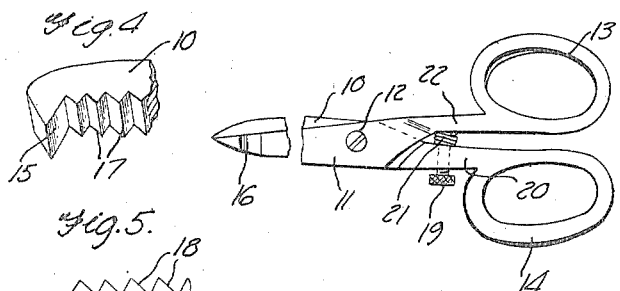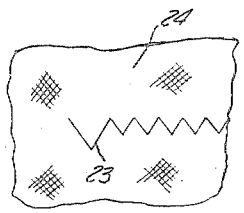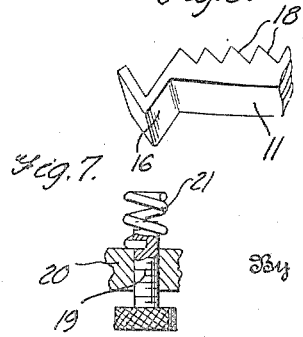

2,491,712

UNITED STATES PATENT OFFICE 2,491,712

PINKING SHEARS

Archie D. Campbell, Whiting, Ind.

Application December 3, 1948, Serial No. 63,279

3 Claims. (Cl. 30—230)

This invention relates to pinking shears, and has for one of its objects the production of a simple and efficient means for marking a pattern with a marking notch without the necessity of putting the shears down to make such a notch.

A further object of this invention is the production of a simple and efficient abutment upon the shears to normally act as an abutment or stop to prevent the cutting of material with the large marking tooth while at the same time facilitating the cutting of the material with the large tooth by simply applying a slight additional pressure.

Other objects and advantages will appear throughout the following specification and claims.

In the drawing:

Figure 1 is a side elevational view of the improved shears;

Figure 2 is a top plan view thereof;

Figure 3 is a transverse sectional view taken on line 3—3 of Figure 2;

Figure 4 is a fragmentary perspective of the outer end of the marking tooth carrying blade;

Figure 5 is a fragmentary perspective view of the outer end of the tooth socket carrying blade;

Figure 6 is a side elevational view of the shears in a closed position, a portion of the blade being broken away;

Figure 7 is an enlarged sectional view of a portion of one blade of the shears, illustrating the resilient bumper;

Figure 8 is a fragmentary plan view of a piece of material illustrating the pinking notches and marking notch cut therein by means of the improved shears.

By referring to the drawing, it will be seen that 10 designates one blade of the shears and 11 designates the companion blade. The blades 10 and 11 are pivotally secured together by means of a conventional screw 12. The blades 10 and 11 are provided with the conventional finger guards 13 and 14 respectively.

The blade 10 constitutes a marking tooth carrying blade having a large lateral extending tapering marking tooth 15 at its outer extremity. The marking tooth 15 extends toward the companion blade adjacent the outer end thereof, as shown in Figure 2. The blade 11 is provided at its outer end with a laterally extending V-shaped tooth socket member 16 which conforms to the contour of the tooth 15 when the shearing blades 10 and 11 are in a closed position such as is shown in Figures 2 and 6. A plurality of pinking teeth 17 are formed along the shearing edge of the blade 10 to interfit with the pinking teeth 18 which are formed along the shearing edge of the blade 11.

An adjustable bumper pin 19 is threaded through the shank 20 of the blade 10 and carries a resilient bumper 21 in the nature of a coil spring. This spring is fixed in any desired manner to the pin 19 and extends toward the shank 22 of the blade 11 for a predetermined distance to provide a resilient bumper between the shanks 20 and 22. The pin may be carried by either of these shanks without departing from the spirit of the invention.

It should be understood that the large tooth 15 and V-shaped socket are formed at the end of the blades 10 and 11 to enable the user to make a pattern marking notch 23 in the fabric 24 without laying the pinking shears aside and picking up another pair of shears to make the large notch. With the present type of shears, the necessity of a second pair of shears is eliminated and the large tooth will make all of the large notches uniform in size. The resilient bumper or spring 21 will prevent the large tooth 15 from cutting except when wanted. The spring 21 is preferably sufficiently stiff to normally act as a stop between the shanks 20 and 22. A slight extra pressure, however, will overcome the resistance of the spring, thereby causing the large tooth 15 and its companion V-shaped socket 16 to cut the marking notch 23 in the fabric 24.

Certain detail changes in the structural features and the structure and location of the bumper or stop may be made without departing from the spirit of the inventon so long as these changes fall within the scope of the appended claims.

Having described the invention, what is claimed as new is:

1. A pair of pinking shears comprising a pair of pivotally connected shearing blades having interfitting relatively small pinking teeth and notches formed upon the shearing edges of the blades, a pattern marking tooth carried at the outer end of one blade, and a companion socket member adapted to receive said pattern marking tooth carried at the outer end of the other blade for marking a pattern when one blade is closed throughout its length relative to the other blade.

2. A pair of pinking shears comprising a pair of pivotally connected shearing blades having interfitting relatively small pinking teeth and notches formed upon the shearing edges of the blades, a large tapering laterally extending pattern marking tooth carried at the outer end of one blade, and a companion substantially V-shaped laterally extending socket member adapted to receive said large pattern marking tooth carried at the outer end of the other blade for marking a pattern when one blade is closed throughout its length relative to the other blade.

3. A pair of pinking shears comprising a pair of pivotally connected shearing blades having interfitting relatively small pinking teeth and notches formed upon the shearing edges of the blades, a pattern marking tooth carried at the outer end of one blade, a companion socket member adapted to receive said pattern marking tooth carried at the outer end of the other blade for marking a pattern when one blade is closed throughout its length relative to the other blade, each blade having a shank, a resilient bumper carried by one shank and adapted to engage the other shank when said blades are closed to a predetermined point to render said marking tooth active, and said resilient bumper being adapted to yield under additional closing pressure upon said shanks to render said marking tooth active and to provide a pattern marking notch upon material which is being cut by the pinking shears.

ARCHIE D. CAMPBELL.

REFERENCES CITED

The following references are of record in the file of this patent:

UNITED STATES PATENTS

| Number | Name | Date |
| --- | --- | --- |
| 2,000,852 | Langbein | May 7, 1935 |